United States Patent Office 3,183,154
Patented May 11, 1965

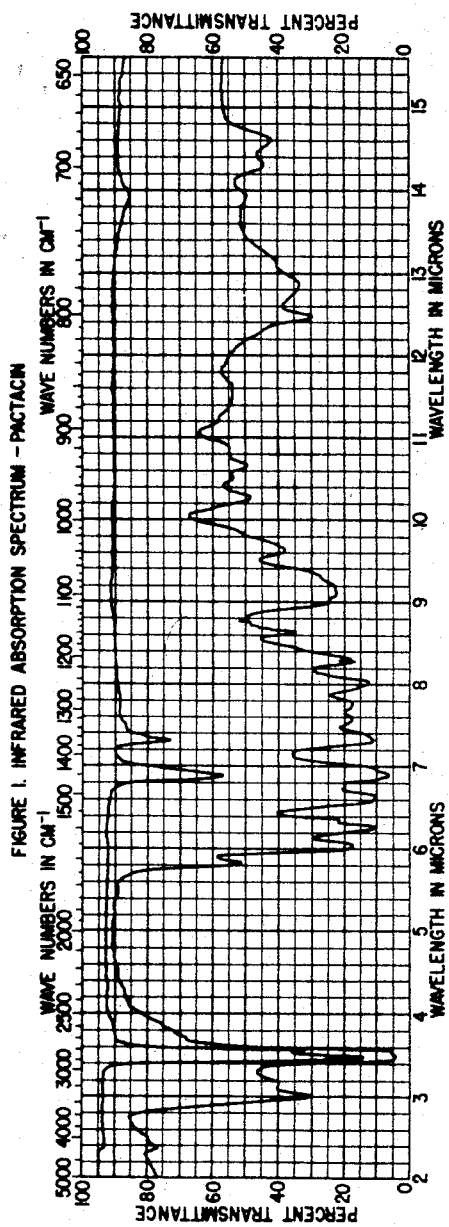
CLARENCE DE BOER
THOMAS E. EBLE
ROSS R. HERR
ALEXANDER D. ARGOUDELIS
INVENTOR.
ATTORNEYS

3,183,154
ANTIBIOTIC PACTACIN AND METHOD OF PRODUCTION
Alexander D. Argoudelis, Clarence De Boer, Thomas E. Eble, and Ross R. Herr, all of Kalamazoo, Mich., assignors to The Upjohn Company, Kalamazoo, Mich., a corporation of Delaware
Filed Oct. 2, 1961, Ser. No. 142,192
11 Claims. (Cl. 167—65)

This invention relates to a novel composition of matter and to a process for the production thereof. More particularly, this invention relates to a new compound, pactacin, and to a process for the production thereof.

Pactacin is a biosynthetic product obtained as an elaboration product of a pactacin-producing actinomycete. It is an amphoteric substance which has a property of adversely affecting the growth of certain organisms, particularly bacteria, for example, *Bacillus subtilis*, *Pseudomonas aeruginosa*, *Klebsiella pneumoniae*, *Proteus vulgaris*, and *Salmonella typhi* and can be used along or in combination with other antibacterial agents to prevent the growth of or reduce the number of such organisms present in various environments. For example, it is useful to control the infection of silk worms caused by pathogenic cultures of *B. subtilis*; it is also useful as an oil preservative, for example, as a bacteriostatic agent to inhibit the growth of certain microorganisms that cause spoilage in cutting oils.

The actinomycete used according to this invention for the production of pactacin has been designated as *Streptomyces pactum* var. *pactum*. One of its strain characteristics is the production of pactacin. A subculture of this variety can be obtained from the permanent collection of the Northern Utilization and Research Division, Agricultural Research Service, U.S. Department of Agriculture, Peoria, Illinois, U.S.A. Its accession number in this repository is NRRL 2939.

*Streptomyces pactum* var. *pactum* has gray to bluish gray aerial growth and gray to grayish olive reverse on most media. Spores are borne in very compact spirals and are covered with fine hairs. Its growth characteristics on standard biological media and its carbon assimilation are given in the following tables.

TABLE I.—APPEARANCE OF EKTACHROME [1]

| Agar medium | Surface | Reverse |
|---|---|---|
| 1. Bennett's | Gray blue | Tan. |
| 2. Czapek's sucrose | Trace gray white | Colorless. |
| 3. Maltose tryptone | Gray white | Yellow. |
| 4. Peptone-iron | None | Do. |
| 5. 0.1% tyrosine | Trace gray white | Pale yellow. |
| 6. Casein starch | Gray white | Do. |

[1] Dietz, A., Ektachrome transparencies as aids in actinomycete classification, Annals of the N.Y. Academy of Science 60: 152–154, 1954.

TABLE II.—ASSIMILATION OF CARBON COMPOUNDS IN SYNTHETIC MEDIUM [1]

| | | |
|---|---|---|
| D-xylose (+) | Cellobiose + | Salicin (+) |
| L-arabinose (+) | Raffinose (+) | Phenol − |
| Rhamnose (+) | Dextrin + | Cresol − |
| D-fructose (+) | Inulin (+) | Na formate (+) |
| D-galactose + | Soluble starch + | Na oxalate (+) |
| D-glucose + | Glycerol + | Na tartrate − |
| D-mannose + | Dulcitol (+) | Na salicylate − |
| Maltose + | D-mannitol (+) | Na acetate + |
| Sucrose (+) | D-sorbitol (+) | Na citrate (−) |
| Lactose (+) | Inositol (+) | Na succinate (−) |
| | | Control (+) |

[1] Pridham, T. G., and Gottlieb, D., "Assimilation of Carbon Compounds in Synthetic Medium," J. Bact. 56: 107–114, 1948.

+ Positive assimilation.
(+) Positive assimilation—only slight growth.
(−) Slight growth—no assimilation.
− No growth.

TABLE III.—CULTURAL CHARACTERISTICS

| Medium | Surface | Reverse | Other |
|---|---|---|---|
| Plain gelatin | Pale gray | | Yellow pigment. Partial liquefaction. |
| Nutrient gelatin | Gray-white | | Do. |
| Nutrient nitrate broth. | | | Colorless vegetative growth dropping to base. Yellow pigment. No reduction. |
| Synthetic nitrate broth. | Pale gray-white. | | Surface pellicle. Slight growth throughout. Trace yellow pigment. Reduction. |
| Litmus milk | do | Blue | Surface pellicle. Peptonization; pH 7.1. |
| Peptone iron agar. | Pale gray-pink | Yellow-tan | No H₂S darkening. |
| Calcium malate agar. | Pale gray-white. | Pale gray-white. | Malate not solubilized. |
| Skim milk agar | Pale gray-pink | Yellow | Yellow pigment. Casein hydrolyzed. |
| Glucose asparagine agar. | Pale lavender-pink. | Pale yellow-tan. | Pale yellow-tan pigment. |
| Tyrosine agar | Pale gray-white. | Pale yellow | Pale yellow pigment. Tyrosine solubilized. |
| Xanthine agar | do | Cream | Pale yellow pigment. Slight xanthine solubilization under growth. |
| Maltose tryptone. | Lavender-gray with cottony white tufts. | Yellow-tan | No pigment. |
| Bennett's agar | Blue-gray | do | Yellow-tan pigment. Gray white aerial at 18 and 24°; blue gray at 28 and 37°. Yellow reverse at 18 and 24°; yellow-tan at 28 and 37°. No growth at 55°. |
| Czapek's sucrose agar. | Pale gray-white. | Pale gray-white. | No pigment. Pale gray-white aerial at 18, 24, 28°; gray at 37°. Yellow reverse at 18 and 24°. Gray-white at 28°; Gray-tan at 37°. No growth at 55°. |

The new compound of the invention is produced when the elaborating organism is grown in an aqueous nutrient medium under submerged aerobic conditions, and preferably in a nutrient medium containing a carbon source, for example, an assimilable carbohydrate, and a nitrogen source, for example, an assimilable nitrogen compound or proteinaceous material. It is to be understood also that for the preparation of limited amounts surface cultures in bottles can be employed. Preferred carbon sources include glucose, brown sugar, sucrose, glycerol, starch, corn starch, lactose, dextrin, molasses, and like carbohydrate sources. Preferred nitrogen sources include corn steep liquor, yeast, autolyzed brewer's yeast with milk solids, soybean meal, cottonseed meal, corn meal, milk solids, pancreatic digest of casein, distiller's solubles, animal peptone liquors, meat and bone scraps, and like nitrogenous sources. Combination of these carbon and nitrogen sources can be used advantageously. Trace metals, for example, zinc, magnesium, manganese, cobalt, iron, and the like, need not be added to the fermentation media since tap water and unpurified ingredients are used as media components.

Production of the compound of the invention can be effected at any temperature conductive to satisfactory growth of the microorganism, for example, between about 18° and 40° C. and preferably between about 26° and 30° C. Ordinary, optimum production of the compound is obtained in from about 2 to 10 days. The medium normally stays fairly close to neutral, or on the alkaline side, during the fermentation. The final pH is dependent, in part, on the initial pH of the culture medium which is advantageously adjusted to about pH 6–8 prior to sterilization, and the buffers present, if any.

When growth is carried out in large vessels and tanks, it is preferable to use the vegetative form of the microorganism for inoculation to avoid a pronounced lag in the production of the new compound and the attendant inefficient utilization of the equipment. Accordingly, it is desirable to produce a vegetative inoculum in a nutrient broth culture by inoculating the broth culture with an aliquot from a soil or slant culture. When a young, active vegetative inoculum has thus been secured, it is transferred aseptically to large vessels or tanks. The medium in which the vegetative inoculum is produced can be the same as, or different from, that utilized for the production of the new compound as long as it is such that a good growth of the microorganism is obtained.

The new compound of the invention is a difunctional molecule having the empirical formula $C_{28}H_{40}N_4O_8$. It has a basic function of about pKa' 6.25–7.25 and an acidic function of about pKa' 9.00–9.60. It is highly soluble in lower-alkanols, e.g., methanol, ethanol, isopropanol, the butanols, and the like; lower-alkyl esters of lower alkanoic acids, e.g., ethyl acetate, n-butyl acetate, amyl acetate, and the like; and chlorinated lower-alkanes, e.g., methylene chloride, chloroform, ethylene dichloride, and the like. It has some solubility in benzene and ether but is insoluble in Skellysolve B (technical n-hexane, B.P. 60–68° C.) and cyclohexane. In water it is soluble at pH's less than 5.0 and greater than 9.5. At the isoelectric point (pH of ca. 8.3) its solubility in water is at a minimum.

In accordance with a preferred procedure for the recovery of the new compound of the invention, the whole beer is adjusted, if necessary or desirable, to a near neutral pH or below, suitably between pH 2 and pH 4, heated to a temperature between 40° C. to 80° C. and filtered. A filter aid, for example diatomite can be used. The filtered beer is then cooled to a conveniently obtained temperature, i.e. 0–5° C. The pH of the cooled filtrate is then adjusted to place the compound in the non-protonated form. This is accomplished by neutralizing the solution with suitable base, for example, sodium hydroxide, to a pH greater than pH 7.5, advantageously to a pH from 7.5 to 8.5. The resulting solution is then extracted with a water-immiscible solvent and the new compound recovered from the solvent phase. If desired, the solvent phase can be acidified and the new compound recovered in the protonated form. This can be accomplished by precipitating the new compound as an insoluble salt or by extracting the solvent extract with an aqueous solution of an acid which forms a water soluble salt, for example, hydrochloric acid, sulfuric acid, phosphoric acid, and acetic acid. Advantageously, the latter is accomplished by adjusting the pH to less than 7.5, preferably from pH 2 to pH 6. The salt is then recovered by evaporation.

If desired, the above-extraction procedure can be repeated as necessary to effect desired purification before the salt is recovered. Also a change of water-immiscible solvent can be utilized to effect further purification. For example, methylene chloride can be utilized to wash out impurities from the aqueous solutions of the salt form or to extract the free base from aqueous solutions of the non-protonated compound.

The new compound of the invention can also be recovered from the filtered beer by adsorption on cation exchange resins. Both the carboxylic and sulfonic acid types can be used. Suitable carboxylic acid resins include the polyacrylic acid resins obtained by the copolymerization of acrylic acid and divinylbenzene by the procedure given on page 87 of Kunin, Ion Exchange Resins, 2nd Ed. (1958), John Wiley and Sons, Inc. Carboxylic acid cation exchange resins of this type are marketed under the trade names Amberlite IRC–50 and Zeokarb 226. Suitable sulfonic acid resins include nuclear sulfonated polystyrene resins cross-linked with divinylbenzene obtained by the procedure given on page 84 of Kunin, supra. Sulfonated cation exchange resins of this type are marketed under the trade names, Dowex–50, Amberlite IR–120, Nalcite HCR, Chempro C–20, Permutit Q, and Zeokarb 225.

The protonated antibiotic is eluted from the resin with water at an acid pH, advantageously at a pH lower than the pKa' of the cation exchange resin used. Satisfactory results are obtained with a pH of about 1 to 6. The excess acid in the eluate is neutralized to about pH 7.5 to 8.5 with a base, e.g., sodium hydroxide or a strongly basic anion exchange resin, and the antibiotic is extracted with a water-miscible solvent according to the process described above. Suitable anion exchange resins for this purpose are obtained by chloromethylating by the procedure given on jages 88 and 97 of Kunin, supra, polystyrene crosslinked, if desired, with divinylbenzene prepared by the procedure given on page 84 of Kunin, supra, and quaternizing with trimethylamine, or dimethylethanolamine by the procedure given on page 97 of Kunin, supra. Anion exchange resins of this type are marketed under the trade names Dowex 2, Dowex 20, Amberlite IRA–400, Duolite A–102, and Permutit S–1.

The novel compound of the invention can also be recovered from harvest beers and other aqueous solutions by adsorption on a surface active adsorbent, for example, silicates, decolorizing carbon, or decolorizing resins, and eluting the adsorbed material with a solvent. Any of the solvents mentioned above can be used. A suitable decolorizing resin is Permutit DR (U.S. Patent 2,702,263).

The new compound of the invention can be purified by successive transfers from protonated to nonprotonated forms and vice versa, especially with intervening other types of treatments, as for example, solvent extractions and washings, chromatography, and fractional liquid-liquid extractions.

Fractional liquid-liquid extraction is accomplished in partition chromatographic columns or in countercurrent distribution apparatus, using such solvent systems as Eethyl acetate-water 1:1
Cyclohexane, ethyl acetate, water 1:1:1.5

It can also be purified by conversion of the protonated or non-protonated compounds to less soluble forms, for example by reaction with picric acid. The salts thus obtained can be used for the same purpose as the free base, or they can be converted back to the free base and then converted to other salts such as the nitrate, oxalate, hydrochloride, and sulfate.

The salts can be converted to the free base by neutralizing with an alkali or by contacting with an anionic resin, advantageously to about pH 7.5 to 8.5. Specific acid salts can then be made by neutralizing the free base with the appropriate acid to below about pH 7.5, and advantageously to about pH 2 to pH 6. Suitable acids for this purpose include hydrochloric, sulfuric, phosphoric, acetic, succinic, citric, oxalic, lactic, maleic, and fumaric, methanesulfonic, benzenesulfonic, helianthic, Reinecke's, azobenzenesulfonic, picric, and like acids.

The new compound of the invention, pactacin, has a broad antibacterial spectrum, and also inhibits the growth of fungi as shown in Tables IV and V.

TABLE IV.—ANTIBACTERIAL ACTIVITY OF PACTACIN

| Test organism: Bacteria— | MIC[1] γ/ml. |
|---|---|
| Bacillus subtilis | 0.8 |
| Staphylococcus aureus | 0.2 |
| Staphylococcus albus | 0.05 |
| Streptococcus hemolyticus | 1.6 |
| Streptococcus fecalis | 1.6 |
| Streptococcus viridans | 3.2 |
| Escherichia coli | 6.5 |
| Klebsiella pneumoniae | 0.8 |
| Pasteurella multocida | 0.012 |
| Proteus vulgaris | 110 |
| Salmonella typhi | 55 |
| Salmonella pullorum | 1.6 |
| Pseudomonas aeruginosa | 110 |

[1] MIC=Minimum inhibitory concentration.

Activity determined in Difco brain heart infusion broth, according to the method of Smith et al., Antibiotics and Chemotherapy, volume 6, pages 135–142, 1956.

TABLE V.—ANTIFUNGAL ACTIVITY OF PACTACIN

| Fungi | Inhibition of growth [1] | |
|---|---|---|
|  | 1000 γ/ml. | 10 γ/ml. |
| Nocardia asteroides | + | − |
| Blastomyces dermatitidis | + | − |
| Coccidioides immitis | + | − |
| Geotrichum sp. | + | − |
| Hormodendrum compactum | + | − |
| Phialophora verrucosa | + | − |
| Cryptococcus neoformans | + | − |
| Histoplasma capsulatum | + | − |
| Sporotrichum schenckii | + | − |
| Monosporium apiospermum | + | − |
| Trichophyton rubrum | + | − |
| Microsporum canis | + | − |
| Trichophyton interdigitale | + | − |
| Candida albicans Abbott | + | − |
| Trichophyton violaceum | + | − |

[1] += Complete inhibition.  −= No inhibition.

The test compound is incorporated in agar in Petri dishes at concentrations of 1000 and 10 mcg./ml. Suspensions of the test fungi are streaked on the agar surface. After incubation for 72 hours at 28° C., the Petri dishes are examined and the degree of inhibition of growth observed.

The new compound of the invention is active against Bacillus subtilis and can be used for treating breeding places of silk worms to prevent or minimize infections caused by this organism. It can also be used to minimize or prevent odor in fish and fish crates caused by this organism. The new compound can be used as a disinfectant on various dental and medical equipment contaminated with Staphylococcus albus or Staphylococcus aureus; it can also be used as a disinfectant on washed and stacked food utensils contaminated with Staphylococcus aureus.

The following examples are illustrative of the process and products of the present invention, but are not to be construed as limiting. All percentages are by weight and all solvent mixture proportions are by volume unless otherwise noted.

Example 1

(A) *Fermentation.*—A soil stock of *Streptomyces pactum* var. *pactum*, NRRL 2939, was used to inoculate ten 500-ml. Erlenmeyer flasks each containing 100 ml. of seed medium consisting of the following ingredients:

| | |
|---|---|
| Glucose monohydrate | grams— 25 |
| Pharmamedia [1] | do— 25 |
| Tap water, q.s. | liters— 1 |

[1] Pharmamedia is an industrial grade of cottonseed flour produced by Traders Oil Mill Co., Fort Worth, Texas.

The seed medium presterilization pH was 7.2. The seed was grown for three days at 28° C. on a Gump rotary shaker operating at 250 r.p.m.

Two shake flasks of the seed, described above (100 ml.) were used to inoculate two 20-liter seed tanks containing 15 liters each of the following sterile seed medium:

| | |
|---|---|
| Glucose monohydrate | grams/liter— 10 |
| Corn steep liquor | do— 10 |
| Pharmamedia | do— 2 |
| Wilson's Peptone Liquor No. 159 [1] | do— 10 |
| Lard oil | ml./liter— 2 |
| Tap water | Balance |

[1] Wilson's Peptone Liquor No. 159 is a preparation of enzymatically hydrolyzed proteins from animal origin.

The presterilization pH of the seed tank medium was 7.2. Each seed tank was grown for 24 hours at a temperature of 28° C., aeration rate of 10 standard liters/min., and agitated at a rate of 400 r.p.m.

The two seed tanks, described above, were then used to inoculate two 380-liter fermentors containing 250 liters of the following sterile medium:

| | |
|---|---|
| Yeast (Pabst) | grams/liter— 25 |
| Black strap molasses | do— 50 |
| Glucose monohydrate | do— 15 |
| pH was adjusted to 6.4 with 50% aqueous NaOH then calcium carbonate was added | grams— 5 |
| Lard oil | ml./liter— 5 |
| Tap water | Balance |

Each of the two fermentors was then grown for 5 days at a temperature of 32° C., aeration rate of 100 standard liters/min., and agitated at a rate of 280 r.p.m.

The biological assay and pH pattern of the above described fermentations were as follows:

FIRST TANK

| Hours | pH | B. subtilis [1] biounits/ml. |
|---|---|---|
| 68 | 6.75 | 108 |
| 92 | 7.7 | 355 |
| 116 | 8.1 | 200 |

SECOND TANK

| Hours | pH | B. subtilis biounits/ml. | Tissue culture [2] assay, KB u./ml. |
|---|---|---|---|
| 70 | 6.9 | 140 | 1.6 |
| 94 | 7.6 | 105 | 18.0 |
| 118 | 8.2 | 230 | 40.0 |

[1] A biounit is that amount of antibiotic when dissolved in 0.8 ml. of the test solution and applied to a 12.7 mm. disk gives a 20 mm. zone of inhibition under standard microbiological conditions.

[2] This tissue culture assay is a measure of the inhibition of protein synthesis in a tissue culture using KB cells.

$$KB\ U/unit\ of\ material\ (mg.\ or\ ml.) = \frac{\text{That dilution of 1 unit of material which effects a 50% inhibition of protein synthesis}}{1000}$$

(B) *Extraction.*—Whole beer from the first tank (250 liters) was heated to 60° C., adjusted to pH 2.55 with concentrated sulfuric acid, and filtered using 4% filter aid. The clear beer (240 liters) was cooled, adjusted to pH 8.5 with 50% aqueous sodium hydroxide, and extracted once with 56 liters of ethyl acetate. The spent beer (240 liters) was discarded. The ethyl acetate extract was washed with 6 liters of water; the wash was discarded. The washed ethyl acetate solution was then back-extracted with water acidified to pH 1.95 with hydrochloric acid. The aqueous extract (16 liters) was adjusted to pH 5.5 with 10% aqueous sodium hydroxide and then freeze-dried to yield 41 grams (preparation DEG–71.1).

The second tank was processed in the same way to yield 22.7 grams (preparation DEG–76.6A).

The material balance for the first tank is given in the following table:

| Fraction | Volume (liters) | B. subtilis (blounits/ml.) | Total blounits (million) |
|---|---|---|---|
| Whole beer | 250 | 330 | 82.5 |
| Clear beer | 240 | 300 | 72 |
| Ethyl acetate extract | 56 | 750 | 42 |
| Spent beer | 240 | 35 | 8.4 |
| Aqueous extract | 16 | 2,400 | 38.4 |
| Freeze-dried (DEG-71.1) | [1] 41 | [2] 800 | 32.8 |

[1] Grams. [2] Per mg.

The tissue culture assay on the two preparations, described above, was as follows:

Preparation:                            KBU/mg.
DEG-71.1 _____ 29
DEG-76.6A _____ 91

(C) *Purification.*—These two preparations (DEG-71.1+DEG-76.6A)

were pooled and subjected to further fractionation by countercurrent distribution using a solvent system of ethyl acetate and water in the ratio of 1:1. Solids determinations were run after 150 transfers and tubes 131 to 140, inclusive, were then pooled to give 8.4 grams (preparation AD-77.10) having a tissue culture assay 200 KBU/mg. Six grams of this preparation was dissolved in a mixture of 15 ml. methylene chloride and 15 ml. acetone and pressed thru a Florisil (a mixture of magnesium and sodium trisilicates) column prepared by slurrying 300 grams of Florisil in Skellysolve B and pouring into a three inch (inside diameter) glass column; the column height was about eighteen inches. The column was eluted as shown in the following table:

FLORISIL CHROMATOGRAPHY OF AD-77.10

| Fraction No. | Eluting solvent | Weight in mg. | Tissue culture, KBU/mg. |
|---|---|---|---|
| 1 | Skellysolve B (SSB) | | |
| 2 | SSB-Acetone, 90:10 | | |
| 3 | SSB-Acetone, 80:20 | | |
| 4 | SSB-Acetone, 80:20 | | |
| 5 | SSB-Acetone, 75:25 | 330 | 91 |
| 6 | SSB-Acetone, 75:25 | 680 | 83 |
| 7 | SSB-Acetone, 70:30 | 240 | 91 |
| 8 | SSB-Acetone, 70:30 | 60 | 143 |
| 9 | SSB-Acetone, 65:35 | 20 | |
| 10 | SSB-Acetone, 65:35 | 10 | |

Preparation AD-85.6 from the above described Florisil column had an equivalent weight of 279 (indicating a molecular weight of about 558) and characteristic ultraviolet absorption spectrum in EtOH:
    239.5 m$\mu$, $\alpha$=51.22
    264(sh.) m$\mu$, $a$=14.81
    313 m$\mu$, $a$=4.88
    356 m$\mu$, $a$=3.25

0.01 ethanolic $H_2SO_4$:
    238 m$\mu$, $a$=50.45
    262(sh.) m$\mu$, $a$=14.65
    314 m$\mu$, $a$=4.75
    352 m$\mu$, $a$=3.51

0.01 ethanolic KOH:
    238.5 m$\mu$, $a$=56.38
    264 m$\mu$, $a$=16.01
    322 m$\mu$, $a$=6.05 a basic function of pKa' 7.25 in water and an acid function of pKa' 9.35 in water, gave a negative ferric chloride test, and had a characteristic infrared absorption spectrum (FIGURE 1 of the accompanying drawing) at the following wave lengths expressed in reciprocal centimeters.

| | | |
|---|---|---|
| 3333[1] M[2] | 1455 S (oil) | 975 M |
| 3175 M | 1370 S (oil) | 950 W |
| 2890 S (oil) | 1320 S | 940 W |
| 2815 M (oil) | 1285 S | 920 W |
| 1718 W | 1247 S | 870 W |
| 1658 S | 1205 S | 803 M |
| 1592 S | 1160 M | 778 M |
| 1575 S | 1100 S | 719 W (oil) |
| 1515 S | 1080 M | 699 M |
| 1504 S | 1038 M | 685 M |

[1] Frequency tolerances are ±20 cm.$^{-1}$ in the 3800–2000 cm.$^{-1}$ range, ± cm.$^{-1}$ in the 2000–1700 cm.$^{-1}$ range, and ±5 cm.$^{-1}$ in the 1700–700 cm.$^{-1}$ interval. The spacing between adjacent bands shall be as indicated in the tabulation with a tolerance of one-fifth of the frequency tolerance.
[2] Band intensities are indicated as "S," "M," and "W," respectively, and are approximated in terms of the backgrounds in the vicinity of the bands. An "S" band is of the same order of intensity as the strongest band in the spectrum; "M" bands are between one-third and two-thirds as intense as the strongest band; and "W" bands are less than one-third as intense as the strongest band. These estimates are made on the basis of a percent transmission scale.

*Example II*

(A) *Fermentation.*—Two 250-liter fermentations were prepared and run as described above in Example I. The assays on these tanks were as follows:

| Tank No. | Fermentation time | B. subtilis, blounits/ml. |
|---|---|---|
| RDP-9 | 64 hours | <100 |
| | 88 hours | <100 |
| | 112 hours | 400 |
| RDP-11 | 64 hours | <100 |
| | 88 hours | 100 |
| | 112 hours | 400 |

(B) *Extraction.*—The whole beers from tanks RPD-9 and 11 were adjusted to pH 2.7–2.8 with concentrated sulfuric acid, heated to 60° C., pooled and cooled to 25° C. The pooled beer (500 liters) was then filtered using 4% filter aid and washed. The clear beer (510 liters) was adjusted to pH 8.5 and extracted once with one-third volume of ethyl acetate. The resulting emulsion was separated by centrifugation to yield 54 liters of ethyl acetate extract. The ethyl acetate was then back-extracted with 2.2 liters of water acidified to pH 1.9 with hydrochloric acid. The 2.2 liters of aqueous extract was adjusted to pH 5.5 with 50% aqueous sodium hydroxide and freeze-dried to yield 15 grams (preparation WTP-108-7).

The material balance is given in the following table:

| Fraction | Volume (liters) | B. subtilis (blounits/ml.) | Total blounits (millions) |
|---|---|---|---|
| Pooled whole beer | 500 | 545 | 272.5 |
| Clear beer | 510 | 400 | 204 |
| Ethyl acetate extract | 54 | 1,800 | 97.2 |
| Spent ethyl acetate | 49 | 800 | 39.2 |
| Freeze-dried (WTP-108-7) | [1] 15 | [2] 2,400 | 36 |

[1] Grams. [2] Per mg.

(C) *Purification.* — Preparation WTP – 108 – 7 (15 grams) was extracted twice with 300 ml. portions of ethyl acetate. The extracts (600 ml.) were pooled and concentrated in vacuo to a volume of 50 ml. This solution was then purified over a Florisil column containing 300 grams of Florisil which was slurried in Skellysolve B. The column was eluted with 400 ml. portions of each of the following combinations:

| Fraction reference No. | Eluting agent | Weight in mg. | KBU/mg. | B. subtilis, biounits/mg. |
|---|---|---|---|---|
| 1 | Skellysolve B (SSB) | | | |
| 2 | SSB+Acetone (90:10) | | | |
| 3 | SSB+Acetone (80:20) | | | |
| 4 | SSB+Acetone (75:25) | | | |
| 5 | SSB+Acetone (75:25) | | | |
| 6 | SSB+Acetone (70:30) | 280 | 250 | 5,500 |
| 7 | SSB+Acetone (70:30) | 740 | 71 | 4,400 |
| 8 | SSB+Acetone (70:30) | 520 | 143 | 5,400 |
| 9 | SSB+Acetone (70:30) | 260 | 200 | 4,400 |
| 10 | SSB+Acetone (70:30) | 300 | 100 | 4,400 |

Fractions 6 to 10, inclusive, were pooled and distributed through 400 transfers in the Craig Countercurrent distribution apparatus using a system of cyclohexane, ethyl acetate, and water in the ratios of 1:1:1.5. Fractions 331 to 370, inclusive, were combined and concentrated in vacuo to an aqueous solution which was lyophilized to yield 1.7 grams (preparation AD–107.1) assaying 3600–4000 B. subtilis biounits/mg., a melting point at 82–83° C., a characteristic ultra-violet absorption spectrum in EtOH:
 239.5 m$\mu$, $a=52.65$
 264 (sh.) m$\mu$, $a=14.76$
 313 m$\mu$, $a=5.21$
 356 m$\mu$, $a=3.38$ 0.01 ethanolic $H_2SO_4$:
 238 m$\mu$, $a=49.42$
 262 m$\mu$, $a=14.61$
 314 m$\mu$, $a=4.40$
 352 m$\mu$, $a=3.45$ 0.01 ethanolic KOH:
 238.5 m$\mu$, $a=56.68$
 264 m$\mu$, $a=16.11$
 322 m$\mu$, $a=6.05$ an infrared absorption spectrum the same as preparation AD–85.6 (described above in Example I, and as shown in FIGURE 1 of the accompanying drawing), and the following elemental analysis:

Calculated for $C_{28}H_{40}N_4O_8$: C, 59.98; H, 7.20; N, 10.00; O, 22.83. Found: C, 60.33; H, 7.07; N, 9.34; O, 22.99.

*Example III*

(A) *Fermentation.*—A fermentation, as described above in Example I, part A, was scaled up to a 5000 liter fermentor.

(B) *Extraction.*—The whole beer (4400 liters assaying 120 B. subtilis units/ml.) was adjusted to pH 2.8 with concentrated sulfuric acid, heated to 60° C., cooled to 30° C., and filtered using 4% filter aid and washed. The clear beer (4800 liters) was cooled to 5° C., adjusted to pH 8.5 with 50% aqueous sodium hydroxide, and then extracted three times with ethyl acetate. The first ethyl acetate extract (450 liters) was kept separate. The second and third ethyl acetate extracts were pooled (3160 liters). The first extract was washed with water, adjusted to pH 8.5 with 50% aqueous sodium hydroxide, and then back-extracted with a 2% volume of deionized water acidified to pH 1.7 with concentrated sulfuric acid. This aqueous extract (11 liters) was adjusted to pH 8.5 and back-extracted twice with ethyl acetate. These two ethyl acetate extracts were then pooled to give 8 liters of extract preparation (DMW–46.8).

The pooled second and third ethyl acetate extracts (3160 liters), described above, were concentrated to one half volume (1580 liters) and extracted with aqueous acid at pH 1.7 as described above for the first ethyl acetate extract. The resulting first aqueous extract was then neutralized with 50% aqueous sodium hydroxide and freeze-dried (preparation DMW–46.11). The second aqueous extract was back-extracted with ethyl acetate at pH 8.5. The ethyl acetate extract was dried by azeotropic distillation and evaporated to dryness (preparation DMW–46.13). Preparations DMW–46.11, and DMW–46.13 were then dissolved into ethyl acetate and the combined ethyl acetate solubles (DMW–46.17) were used as the starting material for a three inch Florisil column which contained 1810 g. of Florisil and had a bed depth of thirty-two inches and a liquid holdup of 3300 ml. The feed, a concentrate of preparations DMW–46.8 and DMW–46.17 (2.6 liters), was washed into the bed with one liquid holdup volume of Skellysolve B (SSB) after first washing the column with SSB. The column was eluted as follows:

One holdup volume of SSB-acetone (90:10)
One holdup volume of SSB-acetone (80:20)
One holdup volume of SSB-acetone (75:25)
Four holdup volumes of SSB-acetone (70:30)

The starting rate of the effluent off the column was 300 ml./min. but the rate gradually dropped to 150 ml./min. during the final stages of the elution. The acitve fractions were pooled to give 19 grams of solids (prep. DMW–53.2) assaying 2500 B. subtilis biounits/mg.

Preparation DMW–53.2 (19 grams), described above, was dissolved in 1 liter of ether. The ether solution was dried with magnesium sulfate and evaporated to dryness. The slightly yellow material obtained was dried in vacuo at room temperature for two hours, yielding 12.2 grams (preparation AD–139.2). Further purification of this preparation was by use of a Florisil column prepared by slurrying 300 grams of Florisil in Skellysolve B and pouring the slurry into a 3″ I.D. glass column. The column had a liquid holdup volume of 200 ml. Preparation AD–139.2 was then slurried in 20 ml. of methylene chloride and placed on the top of the column. The column was eluted with 200 ml. portions of the following solvent combinations:

| Fraction | Eluting agent | Total solids in mg. |
|---|---|---|
| 1 | Skellysolve B (SSB) | 200 |
| 2 | SSB+Acetone (90:10) | 100 |
| 3 | SSB+Acetone (80:20) | 190 |
| 4 | SSB+Acetone (75:25) | 100 |
| 5 | SSB+Acetone (70:30) | 200 |
| 6 | SSB+Acetone (70:30) | 310 |
| 7 | SSB+Acetone (70:30) | 5,200 |
| 8 | SSB+Acetone (70:30) | 2,140 |
| 9 | SSB+Acetone (70:30) | 780 |
| 10 | SSB+Acetone (70:30) | 330 |
| 11 | SSB+Acetone (70:30) | |
| 12 | SSB+Acetone (50:50) | |
| 13 | SSB+Acetone (50:50) | |
| 14 | Acetone | |
| 15 | Acetone | |

The most active fractions, 6, 7, 8, and 9, assayed from 3400 to 4600 B. subtilis biounits/mg. Fraction 8 was standardized at 3.4 B. subtilis biounits/mcg. Fraction 7 had an ultraviolet absorption spectrum in ethanol 239 m$\mu$, $a=48.2$
 313 m$\mu$, $a=4.6$
 355 m$\mu$, $a=3.02$ and an elemental analysis as follows:

Calculated for $C_{28}H_{40}N_4O_8$: C, 59.98; H, 7.20; N, 10.00; O, 22.83. Found: C, 60.80; H, 7.22; N, 9.16; O, 22.82 (by difference).

Example IV

A saturated solution of citric acid in ether was added slowly to 30 ml. of an ether solution containing 400 mg. of preparation Fraction 9 of Example III, Part C until there was no further formation of precipitate. The precipitate, a white amorphous material, was filtered off, washed with ether, and dried; yield 450 mg. About 300 mg. of this material was reprecipitated by dissolving in 1 ml. of acetone and adding ether slowly. The pactacin citrate was precipitated as an amorphous white solid; yield 150 mg. (preparation AD–149.1). It assayed 111 KBU/mg. in tissue culture and 1050 mcg./mg. (free base) against the *B. subtilis* organism and had the following elemental analysis:

Calculated for $C_{28}H_{40}N_4O_8 \cdot C_6H_8O_7$: C, 54.25; H, 6.43; N, 7.44; O, 31.88. Found: C, 54.01; H, 6.52; N, 7.14; O, 32.33 (by difference).

Example V

A saturated solution of oxalic acid in ether was added to 25 ml. of ether containing 300 mg. of preparation Fraction 8 of Example III, Part C, until there was no further formation of precipitate and allowed to stand at room temperature for ten minutes. The resultant precipitate was filtered off, washed with ether, and dried. The dried material (480 mg.) was reprecipitated from a methanol ether solution to give 220 mg. of a white amorphous powder, preparation AD–3.1, which assayed 177 KBU/mg. in tissue culture and 1250 mcg./mg. (free base) against the *B. subtilis* bio assay, and had the following elemental analysis:

Calculated for $C_{28}H_{40}N_4O_8 \cdot C_2O_4H_2$: C, 55.37; H, 6.51; N, 8.61; O, 29.51. Found: C, 54.85; H, 6.50; N, 8.73; O, 29.92 (by difference).

Example VI

Hydrogen chloride was passed through 25 ml. of ether solution containing 300 mg. of preparation Fraction 8 of Example III, Part C, until the formation of the white precipitate ceased. The precipitate was filtered off, washed with ether, and dried to give 325 mg. of practacin hydrochloride, preparation AD–5.1, which assayed 43.5 KBU/mg. in tissue culture and 1175 mcg./mg. (free base) against the *B. subtilis* bioassay, and had the following elemental analysis:

Calculated for $C_{28}H_{40}N_4O_8 \cdot HCl$: C, 56.32; H, 6.92; N, 9.39; O, 21.44; Cl, 5.94. Found: C, 56.18; H, 6.93; N, 8.75; Cl, 6.17; O, 21.97 (by difference).

We claim:

1. A composition of matter assaying at least 20 mcg./mg. of pactacin, a compound which
    (a) is effective in inhibiting the growth of gram-positive and gram-negative bacteria, and
    (b) is effective in inhibiting the growth of KB cells in tissue culture;
   and in its essentially pure cyrstalline form
    (c) is an amphoteric substance with a basic function of pKa' 6.25–7.25 and an acidic function of pKa' 9.0–9.60;
    (d) is highly soluble in lower-alkanols, lower-alkyl esters of lower alkanoic acids, and chlorinated lower-alkanes,
    (e) has a calculated empirical formula $C_{28}H_{40}N_4O_8$;
    (f) has a molecular weight of about 558;
    (g) has a characteristic ultra-violet absorption maxima as follows
       EtOH:
          239.5 mμ, a=51.22
          264 (sh.) mμ, a=14.81
          313 mμ, a=4.88
          356 mμ, a=3.25
       0.01 ethanolic $H_2SO_4$:
          238 mμ, a=50.45
          262 (sh.) mμ, a=14.65
          314 mμ, a=4.75
          352 mμ, a=3.51
       0.01 ethanolic KOH:
          238.5 mμ, a=56.38
          264 mμ, a=16.01
          322 mμ, a=6.05
   and
    (h) has a characteristic infrared absorption spectrum as shown in FIGURE 1 of the accompanying drawing.
2. A compound, pactacin, according to claim 1 in its essentially pure crystalline form.
3. The citrate of pactacin as defined in claim 1.
4. The oxalate of pactacin as defined in claim 1.
5. The hydrochloride of pactacin as defined in claim 1.
6. A compound selected from the group consisting of pactacin according to claim 1 and the acid addition salts thereof.
7. A process which comprises cultivating *Streptomyces pactum* var. *pactum* in an aqueous nutrient medium under aerobic conditions until substantial activity is imparted to said medium by production of pactacin.
8. A process which comprises cultivating *Streptomyces pactum* var. *pactum* in an aqueous nutrient medium containing a source of assimilable carbohydrate and assimilable nitrogen under aerobic conditions until substantial activity is imparted to said medium by production of pactacin and isolating the pactacin so produced.
9. A process according to claim 8 in which the isolation comprises extracting the medium with a water-immiscible solvent for pactacin and recovering pactacin from the solvent extract.
10. A process according to claim 9, in which the recovery of the pactacin from the solvent extract is accomplished by fractional liquid-liquid extraction.
11. A compound as defined in claim 1, pactacin, in its essentially pure form.

References Cited by the Examiner

Antimicrobial Agents and Chemotherapy, 1961, pp. 191–204.

JULIAN S. LEVITT, *Primary Examiner.*

M. O. WOLK, L. GOTTS, *Examiners.*